(12) United States Patent
Otsuka

(10) Patent No.: US 6,529,346 B2
(45) Date of Patent: Mar. 4, 2003

(54) MAGNETIC HEAD SLIDER WITH PROTRUSION ON SURFACE FACING RECORDING MEDIUM

(75) Inventor: Tomoo Otsuka, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/758,527

(22) Filed: Jan. 10, 2001

(65) Prior Publication Data

US 2001/0010613 A1 Aug. 2, 2001

(30) Foreign Application Priority Data

Jan. 21, 2000 (JP) ........................................ 2000-013489

(51) Int. Cl.$^7$ ................................................. G11B 5/60
(52) U.S. Cl. ................................ 360/235.8; 360/235.2; 360/235.6; 360/236.1; 360/236.2; 360/236.3; 360/236.6
(58) Field of Search ........................... 360/235.8, 236.6, 360/236.3, 237, 235.6, 236.4, 235.2

(56) References Cited

U.S. PATENT DOCUMENTS

| | | |
|---|---|---|
| 5,200,867 A | 4/1993 | Albrecht et al. |
| 5,267,104 A | 11/1993 | Albrecht et al. |
| 5,285,337 A | 2/1994 | Best et al. |
| 5,768,055 A | 6/1998 | Tian et al. |
| 5,796,551 A | 8/1998 | Samuelson |
| 6,236,543 B1 * | 5/2001 | Han et al. ................ 360/236.6 |
| 6,356,412 B1 * | 3/2002 | Levi et al. ................ 360/236.6 |
| 6,359,754 B1 * | 3/2002 | Riddering et al. ........ 360/235.6 |
| 6,396,663 B1 * | 5/2002 | Kasamatsu ............... 360/235.7 |
| 6,396,664 B2 * | 5/2002 | Koishi et al. ............ 360/235.6 |

* cited by examiner

Primary Examiner—Robert S. Tupper
(74) Attorney, Agent, or Firm—Brinks Hofer Gilson & Lione

(57) ABSTRACT

A magnetic head slider for writing or reading magnetic information while flying above a magnetic disk, includes a slider body provided with a magnetic head core, and a rail and/or a pad for generating lift, provided on the surface facing a recording medium of the slider body. A crown is formed at least at a position on the rail selected from the group consisting of the surface facing the recording medium of the slider body, the rail, and the pad. The rail includes side-rails formed on both sides of the surface facing the recording medium of the slider body and extending from the air inflow side to the air outflow side of the slider body. A groove is provided between the side-rails. At least one protrusion is provided on each side-rail on the air inflow side and/or on each side of the groove on the air inflow side. The protrusion protrudes more toward the magnetic disk than the side-rails.

34 Claims, 8 Drawing Sheets

$\alpha = 65°$
$\tan\alpha = D/3h$
$D = 3h \cdot \tan\alpha$
$Ap = D^2 \tan 30°$
$As = Ap/\sin\alpha$

MAGNETIC HEAD SLIDER WITH PROTRUSION ON SURFACE FACING RECORDING MEDIUM

BACKGROUND OF THE INVENTION

1. Field of the Invention

The present invention relates to a magnetic head slider, which flies above a magnetic recording medium with a minute spacing therebetween, for writing and reading magnetic information. More particularly, the invention relates to a magnetic head slider in which adhesion of the surface of a slider body facing a recording medium on the side of a magnetic disk to the magnetic disk can be further decreased without adversely affecting the flying.

2. Description of the Related Art

A conventional magnetic disk unit as shown in FIG. 10 is known for magnetic recording apparatuses for computers.

In this magnetic disk unit, a magnetic head slider 82 is disposed opposite to a magnetic disk 81 which is rotatably provided, and the magnetic head slider 82 is supported by an arm 84 with a triangular leaf spring 83 therebetween. The magnetic head slider 82 can be moved to a predetermined position in the diametric direction of the magnetic disk 81 due to the rotation of the arm 84 around a rotation center 84a.

In the magnetic disk unit having the structure shown in FIG. 10, when the magnetic disk 81 is stopped, the bottom surface of the magnetic head slider 82 is gently pressed to the magnetic disk 81 by the elastic force of the leaf spring 83 which supports the magnetic head slider 82. When the magnetic disk 81 is rotated, the magnetic head slider 82 flies above the magnetic disk 81 at a predetermined height using the airflow caused by the rotation. When the rotation of the magnetic disk 81 is stopped, the magnetic head slider 82, which has been flying, comes into contact with the magnetic disk 81 again and stops. Magnetic information is read and written from and into a magnetic recording layer of the magnetic disk 81 while the magnetic head slider 82 is flying. Such a series of operations are usually referred to as CSS (Contact-Start-Stop) operations.

FIG. 11 shows the flying state of a 2-rail type magnetic head slider 82, which is widely used. On the bottom surface of the magnetic head slider 82, a groove (not shown in the drawing) is formed in the center, and side-rails 86 are formed on both sides with the groove therebetween. An inclined area 86a is formed on the lower surface of the tip of each side-rail 86. As the air inflow occurs through the inclined area 86a as indicated by arrows A in FIG. 11, the bottom surface of the side-rail 86 of the magnetic head slider 82 acts as a positive pressure-generating section so that the magnetic head slider 82 flies. In each side-rail 86, the width of the magnetic head slider 82 on the front side (the air inflow side 82a) is set to be broader than the width on the rear side (the air outflow side 82b).

A structure of a magnetic head slider is also known in which, as shown by the double-dotted chain line in FIG. 11, a negative pressure groove 86b is formed in the bottom surface of the side-rail 86, and by balancing negative pressure generated by the negative pressure groove 86b and positive pressure generated by the side-rails 86, flying performance is stabilized.

When the magnetic head slider 82 flies, air flows toward the bottom side of the magnetic head slider 82 through the inclined area 86a, and in the case in which the negative pressure groove 86b is further formed, since negative pressure is generated at the rear of the magnetic head, the magnetic head slider 82 flies while tilting at a very small angle with the air inflow side 82a being lifted. Generally, this angle of tilt is referred to as the pitch angle ($\alpha$: usually, approximately 100 $\mu$Rad).

In the magnetic head slider 82 having the structure as described above, the slider 82 comes into sliding contact with the magnetic disk during starting and during stopping of the magnetic disk 81. Therefore, in order to avoid abrasion and wear on the surface of the magnetic disk, a protective film may be formed on a recording layer of the magnetic disk 81, and a lubricating layer may further be formed on the protective film.

In the magnetic head slider 82 having the structure described above, in view of magnetic recording, since it is advantageous to bring a magnetic gap G of the magnetic head slider 82 as close to the magnetic recording layer of the magnetic disk 81 as possible, the flying height of the magnetic head slider 82 is preferably decreased as much as possible. As the recording densities of the magnetic disk units are increased and magnetic disk units are miniaturized, there are trends to further decrease the flying height (the amount of space between the magnetic head slider 82 and the magnetic disk 81) of the magnetic head slider 82. When the flying height is decreased, the surface roughness of the magnetic disk 81 must be decreased as much as possible in order to avoid contact between the magnetic disk 81 and the magnetic head slider 82 in the flying state. However, during starting or during stopping of the magnetic disk 81, the smoother the surface of the magnetic disk 81, the greater the contact area between the magnetic disk 81 and the magnetic head slider 82, and the slider 82 easily adheres to the magnetic disk 81, thus increasing adhesion torque.

If the adhesion torque is increased, the load during the starting of the motor for rotating the magnetic disk 81 is increased, and a magnetic head element provided on the arm 84 or the slider 82 and the recording layer of the magnetic disk are easily damaged when the magnetic disk 81 starts rotating.

In order to solve such problems, a magnetic head slider was proposed in which, as shown in FIG. 12, by forming a crown on the surface of a magnetic head slider 82 facing a recording medium on the side of a magnetic disk 81, and also by forming a crown on each side-rail 86, the contact area between the magnetic head slider 82 and the magnetic disk 81 is decreased. A magnetic head slider was also proposed in which, as shown in FIG. 13, protrusions 89a and 89b are provided on each side-rail 86 of a magnetic head slider 82 in the longitudinal direction of the side-rail 86, and thus the contact area between the magnetic head slider 82 and the magnetic disk 81 is decreased. Additionally, FIGS. 12 and 13 are side views which show the flying states of the individual magnetic head sliders.

In the magnetic head slider, as described above, because of the demands for increasing the recording density of the magnetic disk unit and for miniaturizing the magnetic disk unit, the flying height of the magnetic head slider 82 tends to be decreased, and the pitch angle is accordingly also decreased.

However, in the conventional magnetic head slider provided with the crown as shown in FIG. 12, if the recording density is increased and the flying height is decreased, the flatness of the magnetic recording medium is increased and the magnetic head slider easily adheres to the magnetic recording medium, and thus the effects anticipated from the provision of the crown are not easily obtained, depending on the pattern of the surface facing the recording medium, i.e., the shape and width of each side-rail 86, and the shape and width of the groove between the side-rails 86.

In the conventional magnetic head slider provided with the protrusions 89*a* and 89*b* as shown in FIG. 13, if the pitch angle is decreased, in the flying state, the protrusion 89*b* near the air outflow side 82*b* protrudes toward the magnetic disk 81 more than the magnetic gap G, and thus it is not possible to decrease the flying height.

Consequently, it may be envisioned that the position of the protrusion 89*b* should be shifted from near the air outflow side 82*b* to the air inflow side 82*a* by a length $L_1$, as indicated by the broken line in FIG. 13. However, when the pitch angle is small, the position of the protrusion 89*b* must be shifted to the air inflow side 82*a* by a considerable amount, and even in such a case, the area in which a portion of the surface of the magnetic head slider 82 facing the recording medium (the surface facing the recording medium in the vicinity of the magnetic gap G), which is not provided with a protrusion, is brought into contact with the magnetic disk 81 is increased when the magnetic disk 81 is stopped, and thus the surface of the magnetic head slider 82 facing the recording medium easily adheres to the magnetic disk 81.

SUMMARY OF THE INVENTION

Accordingly, it is an object of the present invention to further decrease adhesion of the surface facing a magnetic disk of a slider body to the magnetic disk without adversely affecting the flying performance.

In accordance with the present invention, a magnetic head slider, which writes or reads magnetic information while flying above a magnetic disk, includes a slider body provided with a magnetic head core; and a rail and/or a pad for generating lift, provided on the surface facing a recording medium of the slider body. A crown is formed at least at a position on the rail selected from the group consisting of the surface facing the recording medium of the slider body, the rail, and the pad. The rail is provided with side-rails formed on both sides of the surface facing the recording medium of the slider body and extending from the air inflow side to the air outflow side of the slider body. A groove is provided between the side-rails, and at least one protrusion is provided on each side-rail on the air inflow side and/or on each side of the groove on the air inflow side. The protrusion protrudes more toward the magnetic disk than the side-rails.

In the magnetic head slider having the structure described above, since the crown is formed at least at a position on the rail selected from the group consisting of the surface facing the recording medium of the slider body, the rail, and the pad, the contact state between the portions of the side-rails on the air outflow side (portions of the side-rails in the vicinity of the magnetic gap of the magnetic head core) and the magnetic disk can be linear instead of being planar, and thus the contact area between the slider body and the magnetic disk can be reduced, and the effect of decreasing adhesion between the slider body and the magnetic disk can be improved.

By forming the crown on the rail as described above, it is possible, during flying, to bring the magnetic gap of the magnetic head core closer to the magnetic disk in comparison with the other sections. That is, the flying height of the magnetic gap can be set to be the smallest, which is advantageous. Since the side-rails on the air outflow side are not provided with a protrusion, there are no adverse effects on flying.

Since at least one protrusion is provided on each side-rail on the air inflow side and/or on each side of the groove on the air inflow side, and since the protrusion protrudes more toward the magnetic disk than the side-rails, portions of the side-rails on the air inflow side are not in contact with the magnetic disk and the protrusion comes into contact with the magnetic disk. Thus, the effect of decreasing adhesion between the slider body and the magnetic disk can be improved in comparison with a case in which no protrusion is provided. That is, unless at least one protrusion is provided on each side-rail on the air inflow side and/or on each side of the groove on the air inflow side, even if the contact state between the portions of the side-rails on the air inflow side and the magnetic disk is linear, since the contact line is long, adhesion easily occurs. However, if at least one protrusion is provided on each side-rail on the air inflow side and/or on each side of the groove on the air inflow side, the contact state between the protrusion and the magnetic disk can be a point or can be a short line, and thus the effect of decreasing adhesion between the slider body and the magnetic disk is increased.

Since at least one protrusion is provided on each side-rail on the air inflow side and/or on each side of the groove on the air inflow side, at least one protrusion is provided on the slider body on the air inflow side and on each side in the width direction, and thus it is possible to prevent any side in the width direction (lateral direction) of the slider body from tilting and coming into contact with the magnetic disk, and sufficient flying stability can be obtained.

Consequently, in accordance with the magnetic head slider of the present invention, it is possible to provide a magnetic head slider having superior characteristics in which the effect of decreasing adhesion between the slider body and the magnetic disk can be maximized by reducing the contact area between the air inflow side (leading side) of the magnetic head slider and the magnetic disk, and the contact area between the air outflow side (trailing side) and the magnetic disk, during flying, and also flying is not adversely affected.

In the magnetic head slider of the present invention having the structure described above, the rail may be provided with side-rails formed on both sides of the surface facing the recording medium of the slider body and extending from the air inflow side to the air outflow side, and a center rail and/or a pad formed between both side-rails.

In the magnetic head slider of the present invention, preferably, the width of the side-rail on the air inflow side is broader than the width of the side-rail on air the outflow side. The flying attitude can thereby be more satisfactorily maintained.

In the magnetic head slider of the present invention having any one of the structures described above, preferably, a cutout section, which forms a discontinuous surface on the crown, is provided on each side-rail. Consequently, when the magnetic head slider is mounted on an arm with a leaf spring therebetween, the spring pressure sensitivity can be decreased, and also a variation in the distribution of flying heights of the magnetic head slider from the center to the peripheral side can be minimized, and thus a satisfactory constant flying height (CFH) can be obtained.

When the cutout section as described above is provided on the side-rail, the protrusion is preferably provided on the side-rail at a position close to the cutout section in order to improve flying characteristics.

In the magnetic head slider of the present invention having any one of the structures described above, preferably, the height of the protrusion is greater than the crown height. Herein, the height of the protrusion corresponds to a distance from the surface of the side-rail to the apex of the protrusion when the protrusion is provided on the side-rail which is not provided with the cutout section; corresponds to a distance from the bottom surface of the cutout section to the apex of the protrusion when the protrusion is provided on the side-rail provided with the cutout section; and corresponds to a distance from the bottom surface of the groove to the apex of the protrusion when the protrusion is provided in the groove. The crown height corresponds to a distance between a line that links both ends in the longitudinal direction of the surface of the slider body facing the recording medium to each other and the highest position of the crown; or corresponds to a distance between a line that links the starting point to the ending point of the side-rail and the highest position of the crown.

The upper limit of the height of the protrusion is the sum of the flying height of the slider body and an increment in pitch (distance from the magnetic gap×pitch angle).

In the magnetic head slider of the present invention having any one of the structures described above, when the magnetic head slider is flying, preferably, the protrusion protrudes less toward the magnetic disk than the magnetic gap.

In such a magnetic head slider, when the magnetic head slider is flying, the protrusion does not have the smallest flying height. That is, the magnetic gap could be brought closer to the magnetic disk in comparison with the protrusion.

In the magnetic head slider of the present invention having any one of the structures described above, preferably, the protrusion is not provided on the surface of the slider body facing the recording medium in the region in which the distance from the magnetic gap is one-third or less of the length of the slider body. Consequently, it is possible to prevent the protrusion from being closer to the magnetic disk than the magnetic gap during flying of the magnetic head slider.

In the magnetic head slider of the present invention having any one of the structures described above, preferably, the protrusion is composed of a carbon film having a film hardness of 22 GPa or more.

In such a magnetic head slider, by setting the hardness of the protrusion to a film hardness of 22 GPa or more, the abrasion resistance of the protrusion can be significantly improved, and even if the protrusion is brought into sliding contact with the magnetic disk during starting and during stopping, abrasion does not easily occur. Thus, it is possible to prevent the contact area between the slider body and the magnetic disk from increasing, and an increase in adhesion between the slider body and the magnetic disk can be avoided.

In the magnetic head slider of the present invention having any one of the structures described above, preferably, a first carbon film having corrosion resistance is provided, with a bonding layer therebetween, at least at a position on the rail selected from the group consisting of the surface facing the recording medium of the slider body, the rail, and the pad; the protrusion is provided on the first carbon film; the protrusion includes at least one intermediate film and at least one second carbon film alternately formed; and at least the outermost second carbon film has abrasion resistance.

In such a magnetic head slider, since the second carbon film having abrasion resistance is formed on the outermost surface of the protrusion, even if the protrusion is brought into sliding contact with the magnetic disk during starting and during stopping, abrasion does not easily occur, and thus the abrasion resistance of the protrusion can be significantly improved. Furthermore, since the surface of at least the rail selected from the group consisting of the surface of the slider body facing the recording medium, the rail, and the pad is covered by the first carbon film having corrosion resistance, it is possible to prevent the magnetic head core provided on the slider body from deteriorating due to corrosion.

As described above, since the abrasion resistance of the protrusion is significantly improved, it is possible to prevent the contact area between the slider body and the magnetic disk from increasing, and it is also possible to prevent a magnetic head element provided with the magnetic head core, a recording layer of the magnetic disk, etc., from being damaged due to increased adhesion between the slider body and the magnetic disk when the magnetic disk starts rotating.

When the first carbon film and the second carbon film having the characteristics described above are formed by electron cyclotron resonance chemical vapor deposition (ECRCVD), carbon films having different characteristics can be efficiently produced by changing the types of reactant gas (gas containing carbon) to be fed into a deposition system, and by adjusting the substrate bias.

In the magnetic head slider of the present invention having any one of the structures described above, preferably, the first carbon film having corrosion resistance is a carbon film with a hydrogen content of 30 atomic % or more, and the second carbon film having abrasion resistance is a carbon film having a film hardness of 22 GPa or more.

The first carbon film having the hydrogen content of 30 atomic % or more can be deposited, for example, by changing the types of reactant gas (gas containing carbon) to be fed into a deposition system and by adjusting the substrate bias (decreasing the substrate bias) when the first carbon film is formed on the slider body provided with a bonding layer using ECRCVD. By using methane gas as the reactant gas, a carbon film with a hydrogen content of 35 atomic % or more can be deposited. When ethylene gas is used as the reactant gas, it is possible to deposit a carbon film having a hydrogen content of more than 30 atomic % by the substrate bias.

By increasing the hydrogen content in the first carbon film covering the surface of at least the rail selected from the group consisting of the surface of the slider body facing the recording medium, the rail, and the pad as described above, although the film hardness is decreased, density is increased because the carbon becomes amorphous, and adhesion is increased, and thus detachment does not easily occur. Therefore, it is possible to prevent the magnetic head core provided on the slider body from deteriorating due to corrosion.

The second carbon film having a hardness of 22 GPa or more can be deposited by decreasing the hydrogen content in the carbon film, for example, by changing the types of reactant gas (gas containing carbon) to be fed into a deposition system and by adjusting the substrate bias (increasing the substrate bias) when the second carbon film is formed on an intermediate film of the slider body provided with the a bonding layer, a first carbon film, and the intermediate film.

The hydrogen content in the second carbon film is preferably set at less than 30 atomic %.

As described above, by decreasing the hydrogen content in the second carbon film constituting the protrusion, bonds between carbon atoms are strengthened, and thus the hardness can be increased.

The second carbon film may be a carbon film having a hydrogen content of 0 atomic %. Examples of such a carbon film include a film formed of cathodic-arc carbon (CAC). A second carbon film composed of cathodic-arc carbon can be deposited, for example, by placing a slider body provided with a bonding layer, a first carbon film, and an intermediate film in a deposition system, and then subjecting a lump of graphite to arc discharge in a vacuum.

Furthermore, in the magnetic head slider of the present invention having any one of the structures described above, preferably, the magnetic head core is provided with a giant magnetoresistive element.

DESCRIPTION OF THE PREFERRED EMBODIMENTS

The embodiments of the present invention will be described with reference to the drawings.

Figure 1:
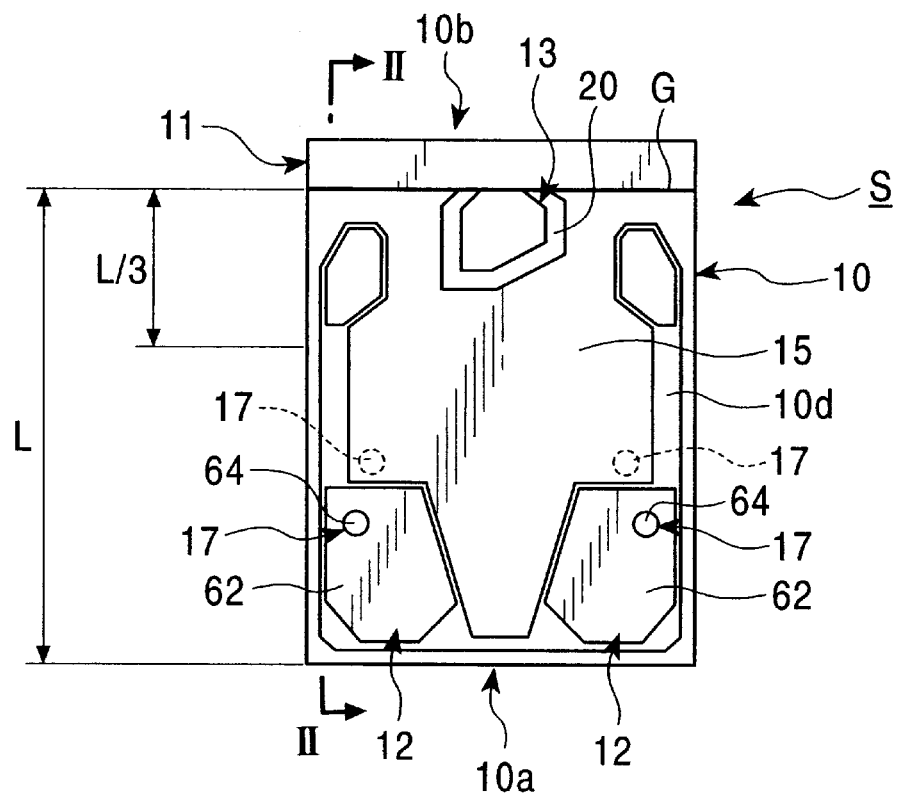
FIG. 1 is a bottom view showing a magnetic head slider in a first embodiment of the present invention.
Figure 2:
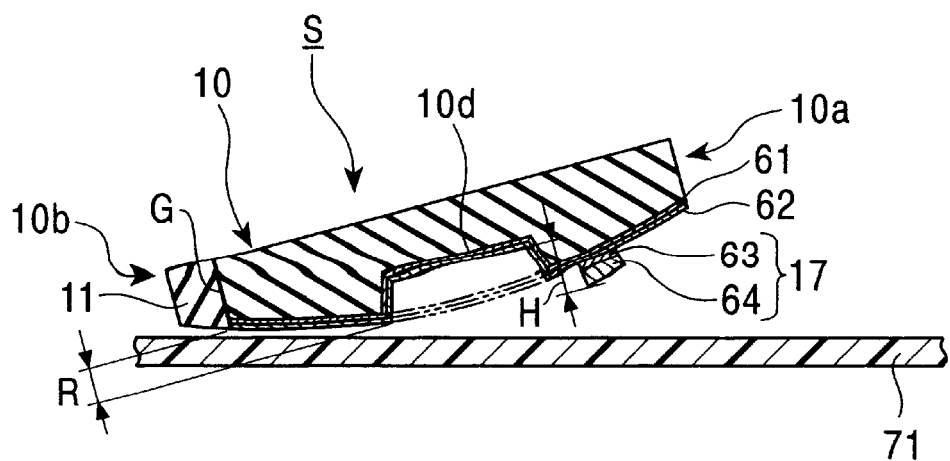
FIG. 2 is a sectional view of the magnetic head slider shown in FIG. 1 in the flying state; taken along line 11—11.

FIG. 1 is a bottom view showing a magnetic head slider in a first embodiment of the present invention, and FIG. 2 is a sectional view taken along the line II—II of FIG. 1, in which the magnetic head slider is in the flying state.

A magnetic head slider S in the first embodiment includes a sheet slider body 10 composed of $Al_2O_3TiC$, etc., and a magnetic head core 11 having a structure described below. The magnetic head slider S overall is composed of a substrate made of a ceramic or the like, and is used in a manner similar to that of the conventional magnetic head slider shown in FIG. 10.

As shown in FIG. 2, a crown is formed on the bottom surface (corresponding to a surface facing a magnetic disk 71) of the slider body 10. Two side-rails 12 are also formed on the bottom surface of the slider body 10 on both sides, extending from the front side to the rear side of the slider body 10.

Additionally, herein, the lower side of the slider body 10 in FIG. 1 is referred to as the front side of the slider body 10, which is generally referred to as the leading side of a slider and which corresponds to a side 10a to which air flows in. On the other hand, the upper side of the slider body in FIG. 1 is referred to as the rear side of the slider body 10, which is generally referred to as the trailing side of a slider and which corresponds to a side 10b out of which air flows.

Each side-rail 12 is provided in order to generate positive pressure, and the width of an end on the air inflow side 10a is broader than the width of an end on the air outflow side 10b. The width of a central section between the end on the inflow side and the end on the outflow side is narrow. An island-like center rail 13 is formed between the rear ends of both side-rails 12. Crowns are also formed on the surfaces of both side-rails 12 and the center rail 13.

Figure 10:
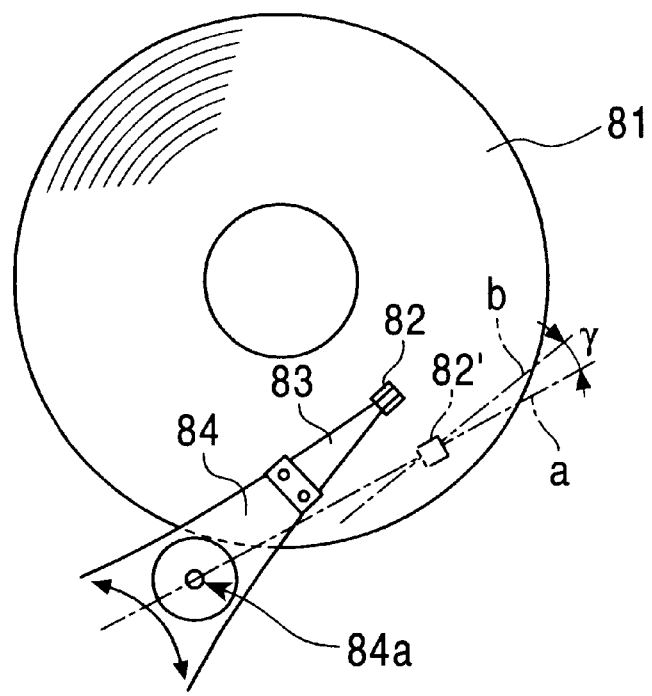
FIG. 10 is a schematic diagram showing a conventional magnetic head slider and a magnetic disk.
Figure 11:
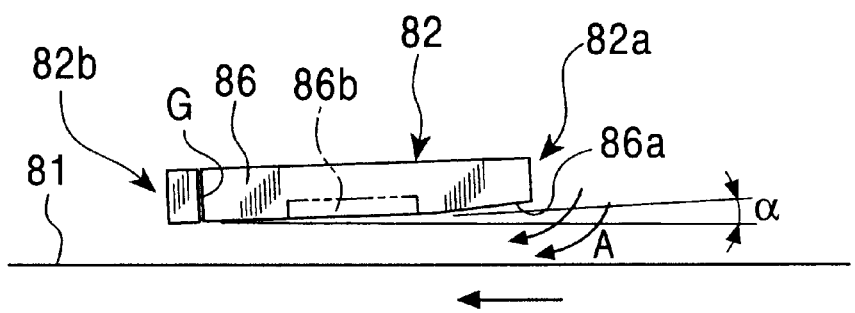
FIG. 11 is a side view which shows the flying state of a conventional magnetic head slider.
Figure 12:
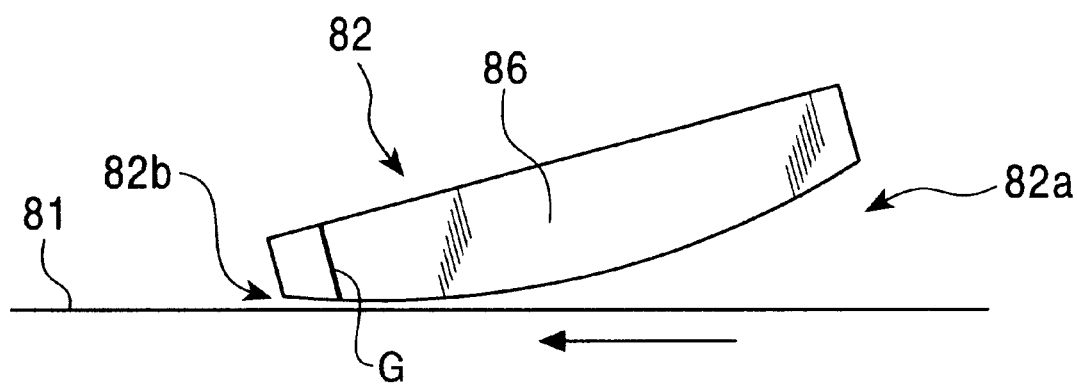
FIG. 12 is a side view which shows the flying state of another conventional magnetic head slider.
Figure 13:
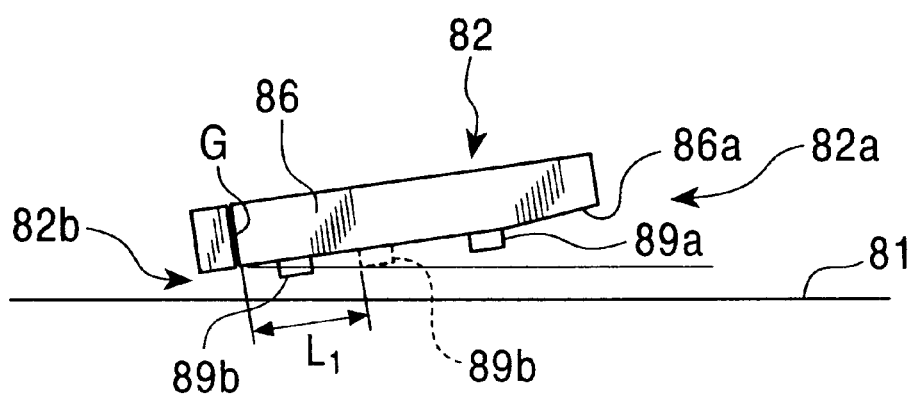
FIG. 13 is a side view which shows the flying state of another conventional magnetic head slider.

A cutout section 10d is formed in the center in the longitudinal direction of each side-rail 12, thus forming a discontinuous surface on the crown. By providing such a cutout section 10, when the magnetic head slider S is mounted on an arm 84 with a leaf spring 83 therebetween as shown in FIG. 10, the spring pressure sensitivity can be decreased, and also a variation in the distribution of flying heights of the magnetic head slider S from the center to the peripheral side can be minimized, and thus a satisfactory constant flying height (CFH) can be obtained.

A step 20 is formed in the periphery of each of the side rails 12 and the center rail 13.

A negative pressure groove 15, which is sandwiched between the side-rails 12, is formed on the bottom surface of the slider body 10. The width of the negative pressure groove 15 increases from the front side to the center. The rear side of the negative pressure groove 15 is divided into two by the center rail 13, and the width of the rear side is narrower than that of the center.

A first carbon film 62 having corrosion resistance is formed on each of the surfaces of the side-rails 12 and the center rail 13 with a bonding layer 61 composed of Si, SiC, or the like therebetween. The first carbon film 62 contains, preferably, 30 atomic % or more of hydrogen, and more preferably, 35 atomic % or more of hydrogen. If the hydrogen content in the first carbon film 62 is less than 30 atomic %, corrosion resistance is degraded and the magnetic head core 11 provided on the slider body 10 is easily deteriorated due to corrosion.

The thickness of the bonding layer 61 is set at approximately 0.5 nm. The thickness of the first carbon film 62 is set at approximately 4.5 nm.

A protrusion 17 is formed on each side-rail 12 near the air inflow side with the bonding layer 61 and the first carbon film 62 therebetween. As shown in FIG. 2, the protrusion 17 protrudes less toward the magnetic disk 71 than a magnetic gap G of the magnetic head core 11 when the magnetic head slider S is flying.

Each protrusion 17 includes an intermediate film 63 made of Si, SiC, or the like and a second carbon film 64 alternately formed (one layer each of the intermediate film 63 and the second carbon film 64 in the drawing). The intermediate film 63 is formed on the first carbon film 62 and acts as an etching stopper when protrusions are formed.

The second carbon film 64 located on the outermost surface of each protrusion 17 has abrasion resistance and is composed of a carbon film having a film hardness of 22 GPa or more.

Figure 5:
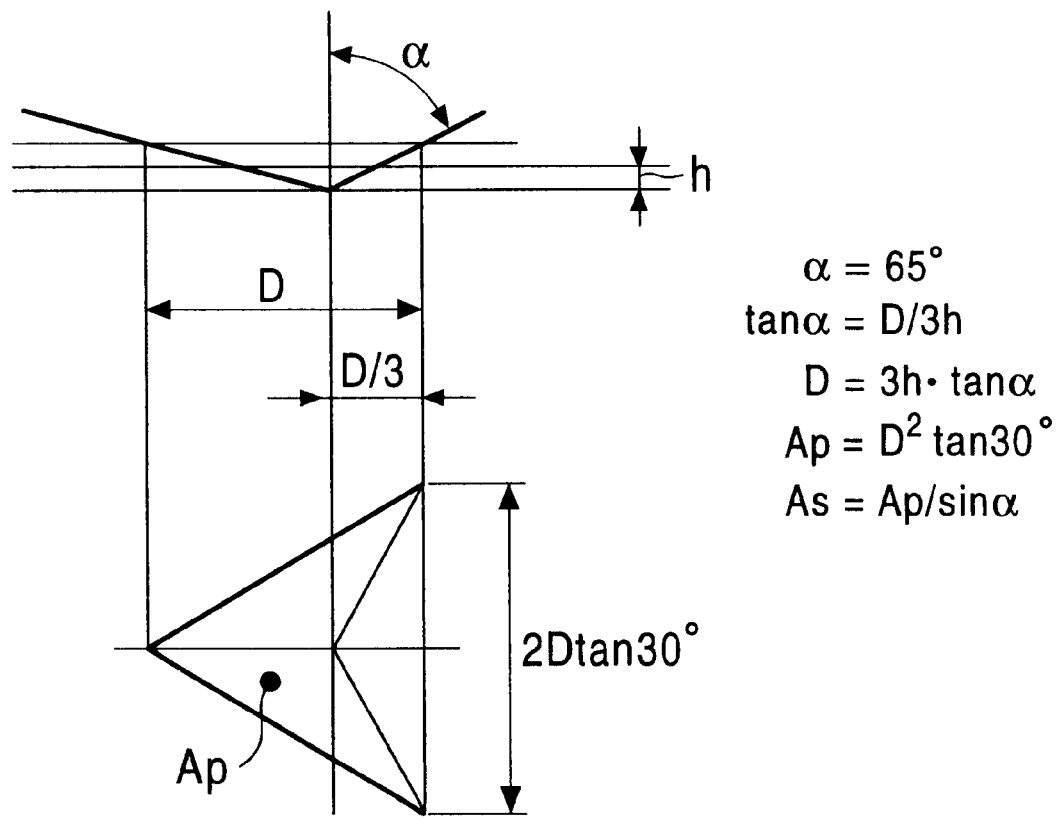
FIG. 5 is a schematic diagram which shows the shape of an indenter used for measuring the film hardness of a second carbon film.

Herein, the film hardness is determined according to the equation (1) below by measuring the indentation depth in response to a load, using an indentation hardness tester. As a measuring indenter provided in the indentation hardness tester, a diamond triangular pyramid indenter with an angle of aperture (α) of 65° as shown in FIG. 5 is used. In FIG. 5, symbol Ap represents a projected area.

$$\text{Film Hardness } (H) = P/As \approx 37.962 \times 10^{-3} \times P/h^2 \qquad (1)$$

(where P is the load, h is the indentation depth, and As is the surface area of the triangular pyramid indenter in relation to the displacement h).

As a specific example of the carbon film having a film hardness of 22 GPa or more, a carbon film having a hydrogen content of less than 43 atomic % is used, and preferably, a carbon film having a hydrogen content of 30 atomic % is used. More preferably, cathodic-arc carbon (CAC) having a hydrogen content of 0 atomic % is used.

The protrusion 17 has a circular cross section.

Preferably, the height H of the protrusion 17 is greater than the crown height R. Herein, the height H of the protrusion 17 corresponds to a distance from the bottom surface of the cutout section 10d to the top of the protrusion 17, and in this embodiment, since the bonding layer 61 and the first carbon film 62 are formed on the surface of the cutout section 10d, the height H corresponds to a distance from the first carbon film 62 over the cutout section 10d to the top of the protrusion 17.

The crown height R corresponds to a distance between a line that links the starting point to the ending point of the side-rail 12 and the highest position of the crown, and in this embodiment, since the bonding layer 61 and the first carbon film 62 are formed on the surface of the side-rail 12, the crown height R corresponds to a distance between a line that links the starting point to the ending point of the surface of the first carbon film 62 on the side-rail 12 and the highest position of the crown.

The acceptable upper limit of the height H of each protrusion 17 is the sum of the flying height of the slider body 10 and an increment in pitch (distance from the magnetic gap G×pitch angle).

The thickness of the intermediate film 63 constituting the protrusion 17 is less than the thickness of the second carbon film 64 having abrasion resistance.

Each protrusion 17 is provided in the region in which the distance from the magnetic gap G, on the side-rail 12, is greater than L/3, where L is the length in the longitudinal direction of the slider body 10. In this way, when the magnetic head slider S is flying, the protrusions 17 do not fly at the lowest position, i.e., it is possible to bring the magnetic gap G closer to the magnetic disk 17 than the protrusions 17, which is advantageous.

The protrusions 17 are not formed in the region in which the distance from the magnetic gap G is L/3 or less. In this way, it is possible to prevent the protrusions 17 from coming closer to the magnetic disk 71 than the magnetic gap G when the magnetic head slider S is flying.

When the cutout section 10d is provided on each side-rail 12 as in this embodiment, each protrusion 17 is preferably provided on the side-rail 12 and at a position close to the cutout section 10d in order to improve flying characteristics.

The height H of each protrusion 17 is, for example, set at greater than 30 nm when the flying height of the magnetic head slider S is 25 nm, the distance between the protrusion 17 and the magnetic gap G is 300 μm, and the crown height R of the side-rail 12 is 30 nm.

A crown is preferably formed on each of the protrusions 17.

Next, the structure of the magnetic head core 11 provided in the center of the rear section of the slider body 10 will be described.

Figure 3:
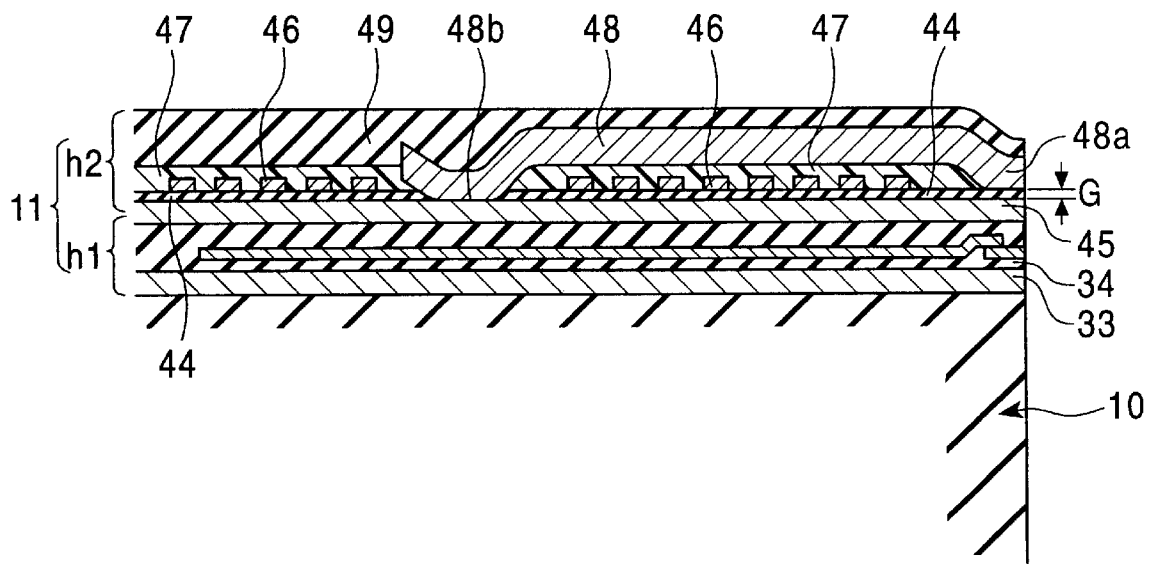
FIG. 3 is a sectional view showing an example of a magnetic head core section provided on a magnetic head slider of the present invention.
Figure 4:
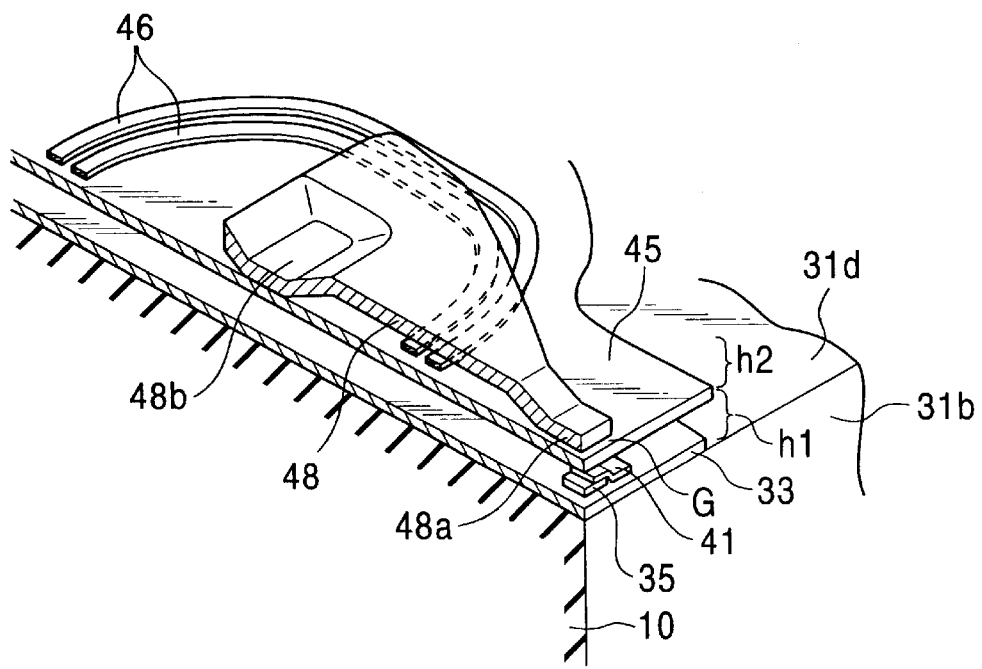
FIG. 4 is a partial sectional view of the example of the magnetic head core section provided on the magnetic head slider of the present invention.

The magnetic head core 11 in this example is a combined magnetic head core having sectional structures as shown in FIGS. 3 and 4. An MR head (read head) h1 and an inductive head (write head) h2 are deposited on the side of the rear end (trailing end) of the slider body 10 in that order.

The MR head h1 reads magnetic signals by detecting leakage flux from a recording medium, such as a disk, using a magnetoresistive effect.

As shown in FIGS. 3 and 4, in the MR head h1, a lower gap layer 34 composed of a nonmagnetic material, such as alumina ($Al_2O_3$) is formed on a lower shielding layer 33 composed of a magnetic alloy, such as Sendust (Fe—Al—Si), formed on the rear end of the slider body 10, and a giant magnetoresistive film (giant magnetoresistive element) 35 is deposited on the lower gap layer 34.

On both sides of the giant magnetoresistive film 35, hard bias layers for applying a bias magnetic field to the film and electrode layers 41 for applying a sensing current are formed, and an upper gap layer is formed further thereon. An upper shielding layer is formed thereon, and the upper shielding layer also acts as a lower core layer 45 of the inductive head h2 provided on the MR head h1.

In the inductive head h2, a gap layer 44 is formed on the lower core layer 45, a coil layer 46 which is planarly, spirally patterned is formed thereon, and the coil layer 46 is surrounded by an insulating layer 47. In an upper core layer 48 formed on the insulating layer 47, a tip 48a thereof is opposed to the lower core layer 45 with a minute spacing therebetween at an ABS 31b, and a base 48b thereof is magnetically coupled to the lower core layer 45. A protective layer 49 composed of alumina or the like is also formed on the upper core layer 48.

In the inductive head h2, a recording current is applied to the coil layer 46, and a recording magnetic field is applied to the core layers from the coil layer 46. Magnetic signals can be written into a magnetic recording medium, such as magnetic disk, by means of a fringing magnetic field from the tip sections of the lower core layer 45 and the upper core layer 48 at a magnetic gap G.

The giant magnetoresistive film 35 includes a laminate with a trapezoidal cross section in which a free ferromagnetic layer, a nonmagnetic layer, a pinned ferromagnetic layer, and an antiferromagnetic layer are deposited.

Both the free ferromagnetic layer and the pinned ferromagnetic layer are composed of ferromagnetic thin films, and specifically, are composed of an Ni—Fe alloy, a Co—Fe alloy, an Ni—Co alloy, Co, an Ni—Fe—Co alloy, or the like. The free ferromagnetic layer may be composed of a Co film, an Ni—Fe alloy film, a laminate including a Co film and an Ni—Fe alloy film, or a laminate including a Co—Fe alloy film and an Ni—Fe alloy film. Additionally, when a two-layer structure including the Co film and the Ni—Fe alloy film is used, preferably, a thin Co film is disposed on the side of the nonmagnetic layer. When a two-layer structure including the Co—Fe alloy film and the Ni—Fe alloy film is used, preferably a thin Co—Fe alloy film is disposed on the side of the nonmagnetic layer.

The reason for the above is that in a mechanism for producing a giant magnetoresistive effect in which the nonmagnetic layer is sandwiched between the free ferromagnetic layer and the pinned ferromagnetic layer, the effect of spin-dependent scattering of conduction electrons is increased at the interface between Co and Cu, and also by forming the free ferromagnetic layer and the pinned ferromagnetic layer with the same material rather than with different materials, the possibility of causing phenomena other than spin-dependent scattering of conduction electrons is decreased, resulting in a higher magnetoresistive effect. Therefore, when the pinned ferromagnetic layer is composed of Co, a structure in which the free ferromagnetic layer on the side of the nonmagnetic layer is replaced by a Co film at a predetermined thickness is preferably used. Even if a Co film is not independently provided, by forming the free ferromagnetic layer on the side of the nonmagnetic layer in the alloy state containing a large amount of Co, a concentration gradient layer may be formed in which the Co concentration gradually decreases toward the side of the nonmagnetic layer.

When the free ferromagnetic layer and the pinned ferromagnetic layer are composed of Co—Fe alloy layers, and the nonmagnetic layer is sandwiched by the free ferromagnetic layer and the pinned ferromagnetic layer, the effect of spin-dependent scattering of conduction electrons is increased, and the possibility of causing phenomena other than spin-dependent scattering of conduction electrons is decreased, resulting in a higher magnetoresistive effect.

The nonmagnetic layer is composed of a nonmagnetic material, such as Cu, Cr, Au, or Ag, and has a thickness of approximately 2 to 4 nm.

The antiferromagnetic layer is preferably composed of an $X_1$—Mn alloy, where $X_1$ is preferably at least one element selected from the group consisting of Ru, Rh, Ir, Pd, and Pt.

When $X_1$ is a single metal element, the preferable $X_1$ content is set at 10 to 45 atomic % for Ru, 10 to 40 atomic % for Rh, 10 to 40 atomic % for Ir, 10 to 25 atomic % for Pd, and 10 to 25 atomic % for Pt.

The Mn-based alloy described above has a disordered crystal structure, which means the state in contrast to the ordered crystal structure, such as face-centered tetragonal crystals (fct ordered lattice; e.g. CuAuI structure). That is, with respect to the Mn-based alloy, after deposition by sputtering or the like, long heat treatment at high temperatures for forming the ordered crystal structure, such as face-centered tetragonal crystals, is not performed. The disordered crystal structure is the state as deposited by sputtering or the like, or in which usual annealing treatment is further performed.

The more preferable $X_1$ content in the $X_1$—Mn alloy (where $X_1$ is at least one element selected from the group consisting of Ru, Rh, Ir, Pd, and Pt) is 37 to 63 atomic %.

The $X_1$—Mn alloy in the compositional range described above has a face-centered cubic lattice in which the arrangement of $X_1$ and Mn atoms is disordered when deposited by sputtering or the like, and an exchange anisotropic magnetic field is not substantially generated at the interface with the ferromagnetic layer. However, by annealing in a magnetic field, transformation into the face-centered tetragonal lattice occurs, and a large exchange anisotropic magnetic field ($H_{ex}$) having unidirectional anisotropy can be produced.

The antiferromagnetic layer may be composed of an $X_1$—Mn—$X_2$ alloy, where $X_1$ is preferably at least one element selected from the group consisting of Ru, Rh, Ir, Pd, and Pt, and $X_2$ is preferably at least one element selected from the group consisting of Au, Ag, Mg, Al, Si, P, Be, B, C, Se, Ti, V, Cr, Fe, Co, Ni, Cu, Zn, Ga, Ge, Y, Zn, Nb, Mo, Hf, Ta, W, Sn, and In.

The ratio of $X_1$ to Mn is, in atomic %, 4:6 to 6:4. The $X_2$ content is 0.2 to 10 atomic %.

When the antiferromagnetic layer is composed of the $X_1$—Mn—$X_2$ alloy, it is also possible to produce a large exchange anisotropic magnetic field ($H_{ex}$) having unidirectional anisotropy by performing annealing treatment in a magnetic field after deposition.

By using the antiferromagnetic layer composed of the $X_1$—Mn alloy or the $X_1$—Mn—$X_2$ alloy, it is possible to apply an exchange anisotropic magnetic field having unidirectional anisotropy to the interface with the pinned ferromagnetic field and to pin the rotation of magnetization of the pinned ferromagnetic layer relative to an external signal magnetic field.

If the antiferromagnetic layer is composed of the $X_1$—Mn alloy, superior corrosion resistance can be obtained in comparison with an Fe—Mn alloy and a variation in the exchange anisotropic magnetic field ($H_{ex}$) over a change in temperature is decreased.

In the MR head h1 having the structure described above, since the electrical resistance of the giant magnetoresistive film 35 changes depending on whether or not a minute fringing magnetic field from the magnetic disk 71 is present, it is possible to read the recorded data in the magnetic disk by detecting the change in resistance.

In order to fabricate the magnetic head slider S having the structure described above, a plurality of magnetic head cores 11 are formed on a plate (wafer) composed of $Al_2O_3TiC$ or the like, and then the plate is cut into a plurality of substrates. Next, the surface of each substrate is subjected to lapping treatment, etc. and a crown is formed on one side (a surface facing a recording medium) of the substrate 10c.

Figure 6A:
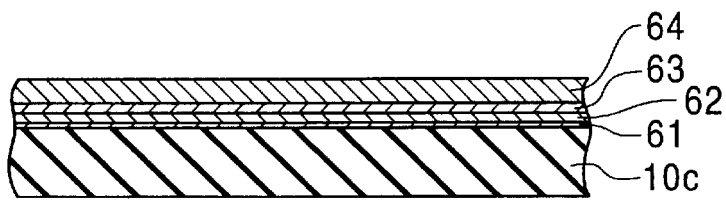
FIGS. 6A to 6F are schematic diagrams illustrating steps in a method for fabricating the magnetic head slider shown in FIGS. 1 and 2.

As shown in FIG. 6A, the bonding layer 61 composed of Si or SiC is formed by sputtering or CVD on the surface of the substrate 10c provided with the crown (on the surface facing the recording medium), and then the first carbon film 62 is deposited by electron cyclotron resonance chemical vapor deposition (ECRCVD), in which the types the reactant gas (gas containing carbon) to be fed into a deposition system are changed and the substrate bias is adjusted (the substrate bias is decreased). By using methane gas as the reactant gas, a carbon film having a hydrogen content of 35 atomic % or more can be deposited. By using ethylene gas as the reactant gas, a carbon film having a hydrogen content of more than 30 atomic % can be deposited by the substrate bias.

By increasing the hydrogen content in the first carbon film 62, which covers the surface of the substrate 10c, to more than 30 atomic %, although the film hardness is decreased, density is increased because the carbon becomes amorphous, and adhesion is increased, and thus the resulting carbon film is not easily detached.

Next, the intermediate film 63 composed of Si or SiC is formed by sputtering or CVD on the surface of the first carbon film 62. The second carbon film 64 having a film hardness of 22 Gpa or more is then deposited on the intermediate film 63 by ECRCVD, in which the types of the reactant gas (gas containing carbon) to be fed into a deposition system are changed and the substrate bias is adjusted (the substrate bias is increased) so that the hydrogen content in the carbon film is decreased to less than 38 atomic %.

By decreasing the hydrogen content in the second carbon film as described above, bonds between carbon atoms are strengthened, and thus the harness can be increased.

When the second carbon film 64 is composed of cathodic-arc carbon, the substrate 10c provided with the bonding layer 61, the first carbon film 62, and the intermediate film 63 is placed in a deposition system and a lump of graphite is subjected to arc discharge in a vacuum.

Figure 6B:
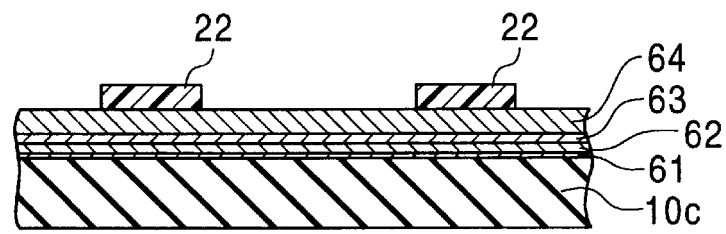

Next, a first resist is applied on the second carbon film 64, and then the first resist is exposed and developed to form a resist pattern 22 as shown in FIG. 6B. The resist pattern 22 covers the regions in which side-rails 12 and the center rail 13 are formed.

Figure 6C:
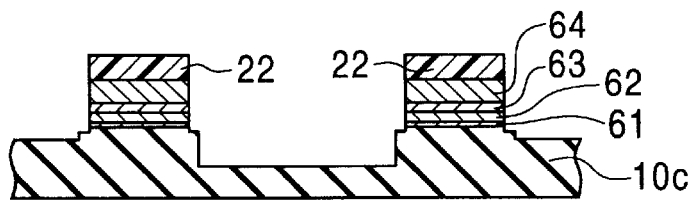

As shown in FIG. 6C, the second carbon film 64, the intermediate film 63, the first carbon film 62, the bonding layer 61, and the substrate 10c in the region not covered by the resist pattern 22 are removed in that order by etching by ion milling. Thus, the side-rails 12 and the center rail 13 are formed. The negative groove 15 is also formed between the side-rails 12, and separating grooves for separating each slider (not shown in the drawing) are formed. The resist pattern 22 is then removed.

Figure 6D:
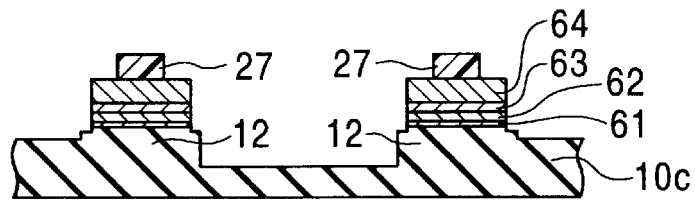

A second resist is applied onto the second carbon film 64, and then the second resist is exposed and developed to form a resist pattern 27 which has the same pattern as that of the protrusion 17 at a predetermined position on the side-rails 12 as shown in FIG. 6D.

Figure 6E:
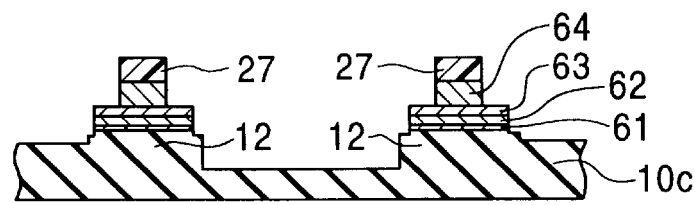

The second carbon film 64 in the region not covered by the resist pattern 27 is removed by etching using oxygen plasma. At this stage, the intermediate layer 63 under the second carbon film 64 serves as an etching stopper, and as shown in FIG. 6E, only the second carbon film 64 is etched while the intermediate layer 63 is not etched.

Figure 6F:
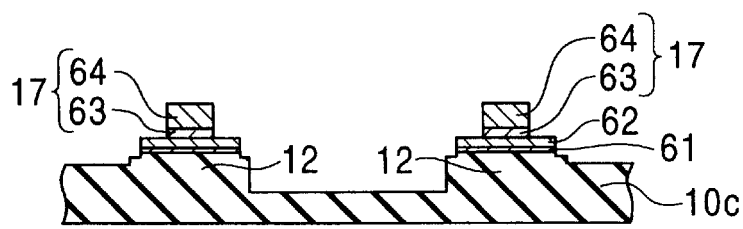

The intermediate film 63 in the region not covered by the resist pattern 27 is removed by etching using $CF_4$ plasma, and then the resist pattern 27 is removed, and thus the protrusion 17 is formed on each side-rail 12 as shown in FIG. 6F. At this stage, only the intermediate film 63 is etched, and the first carbon film 62 under the intermediate film 63 is not etched.

Additionally, a crown may be formed on the surface of the protrusion 17 by lapping or the like.

Next, by separating the substrate 10c along the separating grooves, the magnetic head slider S as shown in FIGS. 1 and 2 can be obtained.

Additionally, the substrate 10c shown in FIGS. 6A to 6F corresponds to a cross section along the lateral direction (the cross section along the width direction of the slider body 10).

The magnetic head slider S fabricated as described above flies relative to the magnetic disk 71 by CSS and magnetic information is written and read as necessary.

Accordingly, when the magnetic disk 71 is stopped, the magnetic head slider S is stopped in the state in which the surface of the air outflow side 10b of each side-rail 12 is gently pressed to the surface of the magnetic disk 71 by the elastic force of the leaf spring 83 provided with the slider S.

When the magnetic disk 71 starts rotating, airflow is generating on the surface of the magnetic disk 71, and the airflow enters into the bottom side of the slider body 10. Since the airflow provides lift to the end of the air inflow side 10a in each side-rail 12, when the lift becomes greater than the elastic force of the leaf spring 83, the slider body 10 starts to fly. Air that flows into the bottom side of the slider body 10 after passing through the end of the air inflow side 10a in each side-rail 12 and air that passes between the side-rails 12 flow into the negative pressure groove 15, and a large negative pressure is generated therein. Thus, the slider 10 tilts at a predetermined pitch angle with the end in air the inflow side being lifted.

In the magnetic head slider S in the first embodiment, since the crown is formed on the side-rails 12 provided on the surface facing the recording medium of the slider body 10, the contact state between the narrow portions of the side-rails 12 (the narrow portions of the side-rails near the magnetic gap G) and the magnetic disk 71 can be linear instead of planar, the contact area between the slider body 10 and the magnetic disk 71 can be decreased, resulting in improvement in the effect of decreasing adhesion between the slider body 10 and the magnetic disk 71. By forming the crown on the side-rails 12 as described above, it is also possible, during flying, to bring the magnetic gap G closer to the magnetic disk in comparison with other sections. That is, the flying height of the magnetic gap G can be set to be the smallest, which is advantageous. Since each side-rail 12 on the air outflow side 10b is not provided with a protrusion, there are no adverse effects on flying.

Since the protrusion 17 is provided on each side-rail 12 on the air inflow side 10a and the protrusion 17 protrudes more toward the magnetic disk 71 than the side-rail 12, the wide portion of each side-rail 12 is not in contact with the magnetic disk 71, and each protrusion 17 is brought into contact with the magnetic disk 71. Thus, the effect of decreasing adhesion between the slider body 10 and the magnetic disk 71 can be improved in comparison with a case in which no protrusion is provided. That is, if no protrusion is provided on each side-rail 12 on the air inflow side, even if the contact state between the wide portion of the side-rail 12 on the air inflow side and the magnetic disk 71 is linear, since the contact line is long, adhesion easily occurs. However, if a protrusion is provided on each side-rail 12 on the air inflow side, the contact state of each protrusion 17 and the magnetic disk 71 is a point or a short line, the effect of decreasing adhesion between the slider body 10 and the magnetic disk 71 is improved.

Since the protrusion 17 is provided on each side-rail on the air inflow side, two protrusions 17 are provided on both sides in the width direction of the slider body 10 on the air inflow side, and thus it is possible to prevent any side in the width direction (lateral direction) of the slider body 10 from tilting and coming into contact with the magnetic disk, and sufficient flying stability can be obtained.

Consequently, in accordance with the magnetic head slider S in this embodiment, it is possible to provide a magnetic head slider having superior characteristics in which the effect of decreasing adhesion between the slider body 10 and the magnetic disk 71 can be maximized by reducing the contact area between the air inflow side 10a and the magnetic disk 71, and the contact area between the air outflow side 10b and the magnetic disk 71, during flying, and also flying is not adversely affected.

In the magnetic head slider in the first embodiment, since the second carbon film 64 having abrasion resistance is formed on the outermost surface of each protrusion 17, even if the protrusion 17 is brought into sliding contact with the magnetic disk 17 during starting and stopping of the magnetic disk 71, abrasion does not easily occur, and thus the abrasion resistance of the protrusion 17 can be significantly improved. Furthermore, since the surface of each side-rail 12 is covered by the first carbon film 62, it is possible to prevent the magnetic head core 11 provided on the slider body 10 from deteriorating due to corrosion.

Additionally, since the abrasion resistance of the protrusion 17 is significantly improved, it is possible to prevent the contact area between the slider body 10 and the magnetic disk 71 from increasing, and it is also possible to prevent the magnetic head element provided on the magnetic head core 11, the recoding layer of the magnetic disk, etc., from being damaged due to increased adhesion between the slider body 10 and the magnetic disk 71 when the magnetic disk starts rotating.

In the embodiment described above, although the protrusion 17 is provided on the air inflow side 10a of each side-rail 12, protrusions 17 may be provided on both sides of the negative groove 15 on the air inflow side 10a as indicated by the broken line in FIG. 1, or the protrusion 17 is provided on the air inflow side 10a of each side-rail 12 and protrusions 17 may be further provided on both sides of the negative groove 15 on the air inflow side 10a. When a protrusion 17 is provided on the groove 15, the height H of the protrusion 17 corresponds to a distance from the bottom surface of the groove 15 to the top of the protrusion 17.

Although the side-rails 12 and the center rail 13 are provided on the surface of the slider body 10 facing the recording medium, pads may be provided on the surface of the slider body 10 facing the recording medium or on the rails.

Although the cutout section 10d is provided on each side-rail 12, the cutout section 10d may not be provided as indicated by the broken line in FIG. 2. When a protrusion 17 is provided on the side-rail 12 on which the cutout section 10d is not provided, the height H of the protrusion 17 corresponds to a distance from the surface of the side-rail 12 to the top of the protrusion 17.

Although the first carbon film 62 is formed on the side-rails 12 and the center rail 13 with the bonding layer 61 therebetween in the embodiment described above, the first carbon film 62 having corrosion resistance may be also formed on the surface facing the recording medium other than the portions of the slider body 10 on which the rails are provided, and on the pad provided on the surface facing the recording medium, and in such a case, the effect of inhibiting corrosion of the magnetic head core 11 can be further improved.

Although the protrusion 17 includes each one layer of the intermediate film 63 and the second carbon film 64 in the embodiment described above, the protrusion 17 may be composed of a multilayered film (with four layers or more) in which intermediate films 63 and second carbon films 64 are alternately deposited, and in such a case, at least the outermost second carbon film has abrasion resistance.

Although one protrusion is provided on each side-rail 12 in the embodiment described above, the present invention is not necessarily limited thereto, and a plurality of protrusions may be provided on each side-rail 12 as long as the protrusions are present in the region in which the distance from the magnetic gap G is greater than L/3, where L is the length of the slider body 10 in the longitudinal direction.

Figure 7:
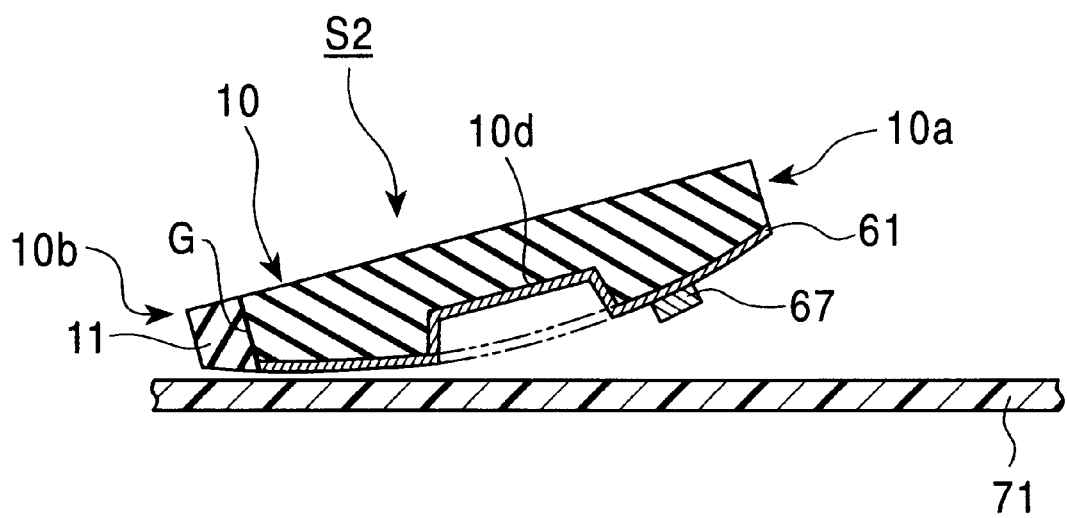
FIG. 7 is a sectional view showing a magnetic head slider in the flying state in a second embodiment of the present invention.

FIG. 7 is a sectional view of a magnetic head slider in the flying state in a second embodiment of the present invention.

A magnetic head slider S2 in the second embodiment shown in FIG. 7 differs from the magnetic head slider S in the first embodiment shown in FIG. 2 in that a protrusion 67 is formed on each side-rail 12 with a bonding layer 61 therebetween, and the protrusion 67 is composed of a carbon film having a film hardness of 22 GPa or more.

The protrusion 67 is provided on each side-rail 12 on the air inflow side 10a in a manner similar to that in the first embodiment, and is provided in the region in which the distance from a magnetic gap G is greater than L/3, where L is the length of a slider body 10 in the longitudinal direction.

In the magnetic head slider in the second embodiment, by setting the film hardness of the protrusion 67 at 22 GPa or more, the abrasion resistance of the protrusion 67 can be significantly improved, and even if the protrusion is brought into sliding contact with a magnetic disk during starting and stopping of the magnetic disk, abrasion does not easily occur, and thus the contact area between the slider body 10 and the magnetic disk 71 is prevented from increasing, and also an increase in adhesion between the slider body 10 and the magnetic disk 71 can be prevented.

EXAMPLE 1

Figure 8:
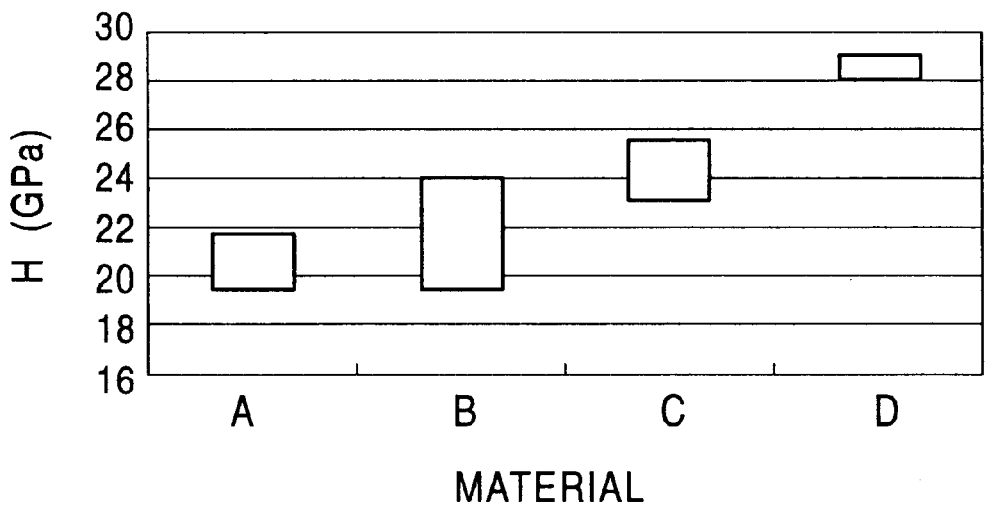
FIG. 8 is a graph which shows film hardness values of materials for constituting outermost carbon films of protrusions of magnetic head sliders.
Figure 9:
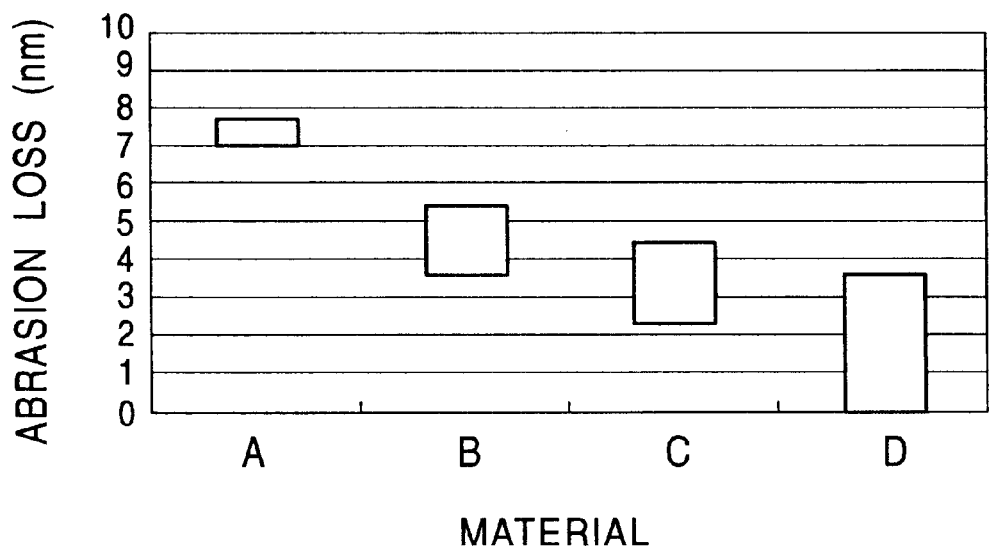
FIG. 9 is a graph which shows the relationships between the materials for constituting outermost carbon films of protrusions of magnetic head sliders and abrasion losses.

The film hardness and the abrasion resistance of protrusions were investigated by using each one of materials A, B, C, and D for forming the second carbon film 64 on the outermost surface of each protrusion 17 in the fabrication process of a magnetic head slider having the structure as shown in FIGS. 1 and 2. The results thereof are shown in FIGS. 8 and 9.

In the magnetic head slider fabricated, a rectangular slider body 10 had a length of 1.2 mm in the long side and a width of 1.0 mm, a negative pressure groove 15 had a width of 0.12 mm at the end on the air inflow side, a maximum width of 0.36 mm, and a depth of 2.5 $\mu$m, each side-rail had a maximum width of 0.34 mm and a minimum width of 0.06 mm, an Si bonding layer 61 had a thickness of 0.5 nm, a first carbon film had a thickness of 4.5 nm, each protrusion 17 had a diameter of 30 mm and a height of 35 nm, an Si intermediate film 63 constituting each protrusion had a thickness of 4 nm, a second carbon film had a thickness of 31 nm, and a distance between the protrusion and a magnetic gap G was set at 900 $\mu$m. The slider body 10 was disposed so that the flying height was 25 nm and the pitch angle was 100 $\mu$Rad.

The material A was formed using methane gas as a reactant gas to be fed into a deposition system and by setting the substrate bias at 110 W when a carbon film was formed by ECRCVD on the Si intermediate film 63 which was formed on a substrate 10c composed of $Al_2O_3TiC$ with the Si bonding layer 61 and the first carbon film 62 therebetween in the fabrication step shown in FIG. 6. The material A had a hydrogen content of 38 atomic %.

The material B was formed using ethylene gas as a reactant gas to be fed into a deposition system in the same manner as that for the material A apart from the fact that the substrate bias was set at 200 W. The material B had a hydrogen content of 28 atomic %.

The material C was formed in the same manner as that for the material B apart from the fact that the substrate bias was set at 400 W, and the material C had a hydrogen content of 26 atomic %.

The material D was cathodic-arc carbon and had a hydrogen content of substantially 0 atomic %.

Abrasion resistance was investigated by measuring the heights of protrusions after 50,000 cycles of normal CSS. In FIG. 9, the abrasion loss corresponds to a difference between the initial height of the protrusion before performing CSS and the height of the protrusion after 50,000 cycles of CSS.

As is obvious from FIG. 8, the protrusion provided with the carbon film composed of the material A on the outermost surface has a film hardness in the range from approximately 20 GPa to approximately 22 GPa, with an average value being approximately 21 GPa; the protrusion provided with the carbon film composed of the material B on the outermost surface has a film hardness in the range of approximately 20 GPa to approximately 24 GPa, with an average value being approximately 22 GPa; the protrusion provided with the carbon film composed of the material C on the outermost surface has a film hardness in the range of approximately 23.6 GPa to approximately 25.8 GPa, with an average value being approximately 24.2 GPa; and the protrusion provided with the carbon film composed of the material D on the outermost surface has a film hardness in the range of approximately 28 GPa to 29.4 GPa, with an average value being approximately 28.7 GPa.

As is obvious from FIG. 9, the protrusion provided with the carbon film composed of the material A having a film hardness of approximately 21 GPa on the outermost surface has an abrasion loss of 7 nm or more. In contrast, the protrusion provided with the carbon film composed of the material B having a film hardness of approximately 22 GPa on the outermost surface has an abrasion loss of 5 nm or less, thus displaying superior abrasion resistance to the material A. Furthermore, the protrusion provided with the carbon film composed of the material C having a film hardness of approximately 24.2 GPa on the outermost surface has an average abrasion loss of approximately 3.5 nm, and the protrusion provided with the carbon film composed of the material D having a film hardness of 28.7 GPa on the outermost surface has an average abrasion loss of approximately 1.8 nm, thus displaying much superior abrasion resistance.

As can be confirmed from the results shown in FIG. 9, since the protrusion provided with the carbon film composed of the material having a film hardness of 22 GPa or more has an abrasion loss of 5 nm or less, which practically presents no problem (i.e., the adhesion torque is small), it is effective to form at least the outermost carbon film of the protrusion to be provided on the rail formed on the slider body, using a carbon film having a film hardness of 22 GPa or more.

EXAMPLE 2

Magnetic head sliders S, in which the second carbon films 64 constituting each protrusion 17 were composed of the material B described above, were fabricated in the same manner as that of the magnetic head sliders fabricated in the first example, apart from the fact that the hydrogen contents in the first carbon films were changed as shown in Table 1 below, and the adhesion of a lubricant was investigated. Herein, the adhesion of the lubricant was investigated by measuring the adhesion after 50,000 cycles of normal CSS. As the lubricant, perfluoropolyether was used.

The results thereof are shown in Table 1. In Table 1, symbol ○ indicates that no adhesion of the lubricant was observed, and symbol x indicates that adhesion of the lubricant was observed. In the column of the abrasion resistance, symbol ⊚ indicates that the protrusion was not substantially worn away and the abrasion was below the measuring limit, symbol ○ indicates that the abrasion of the protrusion was as low as 5 nm or less, and symbol x indicates that the abrasion of the protrusion was as large as 5 to 10 nm.

TABLE 1

| Sample No. | Raw Material | Deposition Method | Hydrogen Content in First Carbon Film (At %) | Adhesion of Lubricant | Abrasion Resistance |
|---|---|---|---|---|---|
| 1 | Methane gas | CVD | 48% | ○ | x |
| 2 | Methane gas | CVD | 39% | ○ | x |
| 3 | Ethylene gas | CVD | 35% | ○ | x |
| 4 | Ethylene gas | CVD | 29% | x | ○ |
| 5 | Ethylene gas | CVD | 27% | x | ○ |
| 6 | Graphite | Arc discharge | 0% | x | ⊚ |

As is obvious from Table 1, with respect to the adhesion of the lubricant, in Sample Nos. 1 to 3 in which the hydrogen content in the carbon film was 35 atomic % or more, no adhesion of the lubricant was observed, thus being satisfactory. In sample Nos. 4 to 6 in which the hydrogen content in the carbon film was less than 30 atomic %, although the abrasion of the protrusion was decreased and satisfactory abrasion resistance was obtained, adhesion of the lubricant occurred. Consequently, at the hydrogen content of 35 atomic % or more, satisfactory results can be obtained with respect to adhesion of the lubricant, and at the hydrogen content of 30 atomic % or less, satisfactory abrasion resistance can be obtained.

In accordance with the magnetic head slider of the present invention, due to the structure described above, it is possible to provide a magnetic head slider having superior characteristics in which the effect of decreasing adhesion between the slider body and the magnetic disk can be maximized by reducing the contact area between the air inflow side (leading side) of the magnetic head slider and the magnetic disk and the contact area between the air outflow side (trailing side) and the magnetic disk, during flying, and also flying is not adversely affected.

What is claimed is:

1. A magnetic head slider for writing or reading magnetic information while flying above a magnetic disk, comprising:
   a slider body provided with a magnetic head core; and
   a rail for generating lift, provided on the surface facing a recording medium of the slider body,
   wherein a crown is formed at a portion on the rail; the rail comprises side-rails formed on both sides of the surface facing the recording medium of the slider body, the side-rails extending from the air inflow side to the air outflow side of the slider body; a groove is provided between the side-rails; at least one protrusion is provided on each side-rail on the air inflow side and on each side of the groove on the air inflow side; and the protrusion protrudes more toward the magnetic disk than the side-rails, and
   further wherein the protrusion is not provided on the surface facing the recording medium of the slider body in the region in which the distance from a magnetic gap of the magnetic head core is one-third or less of the length of the slider body.

2. A magnetic head slider according to claim 1, wherein the rail further comprises a center rail and/or a pad formed between both side-rails.

3. A magnetic head slider according to claim 1, wherein the width of each side-rail on the air inflow side is broader than the width of each side-rail on the air outflow side.

4. A magnetic head slider according to claim 1, wherein each side-rail is provided with a cutout section which forms a discontinuous surface on the crown.

5. A magnetic head slider according to claim 1, wherein the height of the protrusion is greater than the crown height.

6. A magnetic head slider according to claim 1, wherein, when the magnetic head slider is flying, the protrusion protrudes less toward the magnetic disk than a magnetic gap of the magnetic head core.

7. A magnetic head slider according to claim 1, wherein the protrusion comprises a carbon film having a film hardness of 22 GPa or more.

8. A magnetic head slider according to claim 1, wherein the magnetic head core comprises a giant magnetoresistive element.

9. A magnetic head slider for writing or reading magnetic information while flying above a magnetic disk, comprising:
   a slider body provided with a magnetic head core; and
   a rail for generating lift, provided on the surface facing a recording medium of the slider body, wherein a crown is formed at a portion on the rail; the rail comprises side-rails formed on both sides of the surface facing the recording medium of the slider body, the side-rails extending from the air inflow side to the air outflow side of the slider body; a groove is provided between the side-rails; at least one protrusion is provided on each side-rail on the air inflow side and on each side of the groove on the air inflow side; and the protrusion protrudes more toward the magnetic disk than the side-rails, and further wherein a first carbon film having corrosion resistance is provided at least at a position on the rail selected from the group consisting of the surface facing the recording medium of the slider body, the rail, and the pad with a bonding layer therebetween; the protrusion is formed on the first carbon film; the protrusion comprises at least one intermediate film and at least one second carbon film alternately formed; and at least the outermost second carbon film in said at least one second carbon film has abrasion resistance.

10. A magnetic head slider according to claim 9, wherein the rail further comprises a center rail and/or a pad formed between both side-rails.

11. A magnetic head slider according to claim 9, wherein the width of each side-rail on the air inflow side is broader than the width of each side-rail on the air outflow side.

12. A magnetic head slider according to claim 9, wherein each side-rail is provided with a cutout section which forms a discontinuous surface on the crown.

13. A magnetic head slider according to claim 9, wherein the height of the protrusion is greater than the crown height.

14. A magnetic head slider according to claim 9, wherein, when the magnetic head slider is flying, the protrusion protrudes less toward the magnetic disk than a magnetic gap of the magnetic head core.

15. A magnetic head slider according to claim 9, wherein the protrusion is not provided on the surface facing the recording medium of the slider body in the region in which the distance from a magnetic gap of the magnetic head core is one-third or less of the length of the slider body.

16. A magnetic head slider according to claim 9, wherein the protrusion comprises a carbon film having a film hardness of 22 GPa or more.

17. A magnetic head slider according to claim 9, wherein the magnetic head core comprises a giant magnetoresistive element.

18. A magnetic head slider for writing or reading magnetic information while flying above a magnetic disk, comprising:

a slider body provided with a magnetic head core; and a rail for generating lift, provided on the surface facing a recording medium of the slider body, wherein a crown is formed at a portion on the rail; the rail comprises side-rails formed on both sides of the surface facing the recording medium of the slider body, the side-rails extending from the air inflow side to the air outflow side of the slider body; a groove is provided between the side-rails; at least one protrusion is provided on each side-rail on the air inflow side or on each side of the groove on the air inflow side; and the protrusion protrudes more toward the magnetic disk than the side-rails, and further wherein the protrusion is not provided on the surface facing the recording medium of the slider body in the region in which the distance from a magnetic gap of the magnetic head core is one-third or less of the length of the slider body.

19. A magnetic head slider according to claim 18, wherein the rail further comprises a center rail and/or a pad formed between both side-rails.

20. A magnetic head slider according to claim 18, wherein the width of each side-rail on the air inflow side is broader than the width of each side-rail on the air outflow side.

21. A magnetic head slider according to claim 18, wherein each side-rail is provided with a cutout section which forms a discontinuous surface on the crown.

22. A magnetic head slider according to claim 18, wherein the height of the protrusion is greater than the crown height.

23. A magnetic head slider according to claim 18, wherein, when the magnetic head slider is flying, the protrusion protrudes less toward the magnetic disk than a magnetic gap of the magnetic head core.

24. A magnetic head slider according to claim 18, wherein the protrusion comprises a carbon film having a film hardness of 22 GPa or more.

25. A magnetic head slider according to claim 18, wherein the magnetic head core comprises a giant magnetoresistive element.

26. A magnetic head slider for writing or reading magnetic information while flying above a magnetic disk, comprising:

a slider body provided with a magnetic head core; and a rail for generating lift, provided on the surface facing a recording medium of the slider body, wherein a crown is formed at a portion on the rail; the rail comprises side-rails formed on both sides of the surface facing the recording medium of the slider body, the side-rails extending from the air inflow side to the air outflow side of the slider body; a groove is provided between the side-rails; at least one protrusion is provided on each side-rail on the air inflow side or on each side of the groove on the air inflow side; and the protrusion protrudes more toward the magnetic disk than the side-rails, and further wherein a first carbon film having corrosion resistance is provided at least at a position on the rail selected from the group consisting of the surface facing the recording medium of the slider body, the rail, and the pad with a bonding layer therebetween; the protrusion is formed on the first carbon film; the protrusion comprises at least one intermediate film and at least one second carbon film alternately formed; and at least the outermost second carbon film in said at least one second carbon film has abrasion resistance.

27. A magnetic head slider according to claim 26, wherein the rail further comprises a center rail and/or a pad formed between both side-rails.

28. A magnetic head slider according to claim 26, wherein the width of each side-rail on the air inflow side is broader than the width of each side-rail on the air outflow side.

29. A magnetic head slider according to claim 26, wherein each side-rail is provided with a cutout section which forms a discontinuous surface on the crown.

30. A magnetic head slider according to claim 26, wherein the height of the protrusion is greater than the crown height.

31. A magnetic head slider according to claim 26, wherein, when the magnetic head slider is flying, the protrusion protrudes less toward the magnetic disk than a magnetic gap of the magnetic head core.

32. A magnetic head slider according to claim 26, wherein the protrusion is not provided on the surface facing the recording medium of the slider body in the region in which the distance from a magnetic gap of the magnetic head core is one-third or less of the length of the slider body.

33. A magnetic head slider according to claim 26, wherein the protrusion comprises a carbon film having a film hardness of 22 GPa or more.

34. A magnetic head slider according to claim 26, wherein the magnetic head core comprises a giant magnetoresistive element.

* * * * *